(12) United States Patent
Gibby

(10) Patent No.: US 7,201,383 B2
(45) Date of Patent: Apr. 10, 2007

(54) CARRIER FOR GAS AND LIQUID CYLINDERS

(76) Inventor: Daniel K. Gibby, Route 2, Box 2391, Toccoa, GA (US) 30577

( * ) Notice: Subject to any disclaimer, the term of this patent is extended or adjusted under 35 U.S.C. 154(b) by 143 days.

(21) Appl. No.: 10/705,536

(22) Filed: Nov. 10, 2003

(65) Prior Publication Data

US 2005/0001394 A1 Jan. 6, 2005

Related U.S. Application Data

(60) Provisional application No. 60/464,584, filed on Apr. 22, 2003.

(51) Int. Cl.
  *B62B 1/00* (2006.01)
(52) U.S. Cl. .................. 280/47.26; 220/622; 220/826
(58) Field of Classification Search ............ 280/79.11, 280/79.6, 47.131, 47.24, 47.26, 79.5; 229/4.5; 220/684, 610, 622, 324, 826
  See application file for complete search history.

(56) References Cited

U.S. PATENT DOCUMENTS

| | | | |
|---|---|---|---|
| 1,873,690 A * | 8/1932 | Ward ........................ 414/453 |
| 2,182,116 A * | 12/1939 | Copeman .................... 62/125 |
| 2,644,578 A * | 7/1953 | Bramming ................. 206/585 |
| 3,246,825 A * | 4/1966 | Zastrow ................. 220/592.19 |
| 4,294,481 A | 10/1981 | Pearl |
| 4,486,044 A | 12/1984 | Gordon et al. |
| 4,767,139 A * | 8/1988 | Hansing ..................... 292/162 |
| 4,905,855 A | 3/1990 | Troiano et al. |
| 4,964,529 A * | 10/1990 | Houston .................... 206/523 |
| 5,263,727 A * | 11/1993 | Libit et al. .................... 280/40 |
| 5,335,954 A | 8/1994 | Holub et al. |
| 5,407,077 A * | 4/1995 | Sinclair, Sr ................ 206/586 |
| 5,427,272 A * | 6/1995 | Gaspari ...................... 220/737 |
| 5,489,183 A * | 2/1996 | Malden et al. .............. 414/490 |
| 5,638,858 A | 6/1997 | Gettinger et al. |
| 5,673,847 A * | 10/1997 | Swink ........................ 229/113 |
| 6,042,130 A * | 3/2000 | Souza ....................... 280/79.5 |
| 6,116,623 A * | 9/2000 | Salvucci .................. 280/47.26 |
| 6,386,384 B1 | 5/2002 | Chohfi et al. |
| 6,386,559 B1 * | 5/2002 | Souza ..................... 280/47.26 |
| 6,454,123 B1 | 9/2002 | Ritson |
| 6,666,333 B2 * | 12/2003 | Auclair ...................... 206/521 |
| 6,929,142 B2 * | 8/2005 | Gilbert et al. .............. 220/216 |
| 2001/0033064 A1 | 10/2001 | Sinchok |
| 2001/0040166 A1 | 11/2001 | Pietrantoni |

* cited by examiner

*Primary Examiner*—Christopher P. Ellis
*Assistant Examiner*—Brian Swenson
(74) *Attorney, Agent, or Firm*—The Webb Law Firm

(57) ABSTRACT

A carrier for transporting a pressurized cylinder includes a container of box-like proportions for accommodating the pressurized cylinder therein, wherein the container includes a top portion having an opening therein, a bottom portion, and a plurality of side portions. The container may receive the cylinder with a friction fit. A plurality of side flaps may be pivotally connected to the container to partially cover the opening. Wheels and a telescoping handle may also be attached to the container. A lid with cutouts to receive the side flaps may be included, and a stabilizer may be positioned on the bottom portion to engage the base of the cylinder.

9 Claims, 11 Drawing Sheets

CARRIER FOR GAS AND LIQUID CYLINDERS

CROSS REFERENCE TO RELATED APPLICATION

This application claims the benefit of U.S. Provisional Patent Application No. 60/464,584, filed Apr. 22, 2003, and entitled "Carrier for Gas Cylinders", the contents of which are incorporated herein by reference.

BACKGROUND OF THE INVENTION

1. Field of the Invention

The present invention relates to containers for cylinders and, more specifically, to portable carriers for pressurized cylinders, such as propane or freon tanks.

2. Description of Related Art

Carriers for gas cylinders are known in the art. For example, U.S. Pat. No. 4,905,855 to Troiano et al. discloses a propane tank safety carrier that consists of a box-like housing with a hinged cover for holding a propane tank in an upright protective position during transportation. Foam packing insert is used for horizontal stabilization of the propane tank. Although the aforementioned prior art can support a gas cylinder, the prior art has certain specific drawbacks. One such drawback is the use of foam to stabilize the container. The foam can easily be damaged by wear and tear from continuous insertion and removal of the propane tank. Furthermore, foam is susceptible to the elements, especially since foam can absorb moisture. Thus, the prior art is not conducive to outdoor use or harsh working environments. Troiano et al. also shows an embodiment which excludes the foam insert, but it requires a lid that completely encloses the valves on the tank. In addition, the Troiano et al. invention requires a pin to be threaded from the outside of the lid into the threaded sleeve of the valve assembly in order to lock the lid. Insertion of the pin would be awkward if the valve assembly is not perfectly aligned. Another drawback of the prior art is the lack of upright rolling mobility for the propane tank. Thus, the prior propane tank containers must be hand-carried, which may be awkward or very difficult for some people.

SUMMARY OF THE INVENTION

To overcome the deficiencies of the prior art, what is needed, and has not heretofore been developed, is a carrier for securely holding pressurized cylinders of various sizes, and allowing for easy transportation of the cylinders.

To this end, the present invention is directed to a carrier for transporting a pressurized cylinder. The carrier includes a container of box-like proportions for accommodating the pressurized cylinder therein, wherein the container includes a top portion having an opening therein, a bottom portion, and a plurality of side portions. A plurality of side flaps is pivotally connected to the container, wherein when the side flaps are moved to a closed position, the opening of the container is only partially covered. Each side flap has releasable engagement means, preferably at least one lever, with a dowel corresponding to each lever. Each lever is tension engaged and may move from a first position to a second position, so that movement from the first position to the second position into a receiving portion of the container secures the side flap in a closed position. Hence, the pressurized cylinder is secured within the container. The carrier may also include a lid having cutaway portions to accommodate the side flaps. The lid may have notches therein which receive the dowels from the side flaps in order to secure the side flaps in an upright position and to secure the lid over the top portion of the container.

A stabilizer may be provided on the bottom portion of the container to secure a base of the pressurized cylinder. The container may also include various means to aid in the transportation of the container. These may include, but are not limited to hand holes, and securing holes or strap receiving openings. The container may also include wheels attached to the bottom portion of the container and a telescoping handle attached to one of the plurality of side portions. Thus, in addition to being carried, the container may also be pushed or pulled.

These and other advantages of the present invention will be understood from the description of the preferred embodiments, taken with the accompanying drawings, wherein like reference numerals represent like elements throughout.

DETAILED DESCRIPTION OF THE PREFERRED EMBODIMENTS

Figure 1:
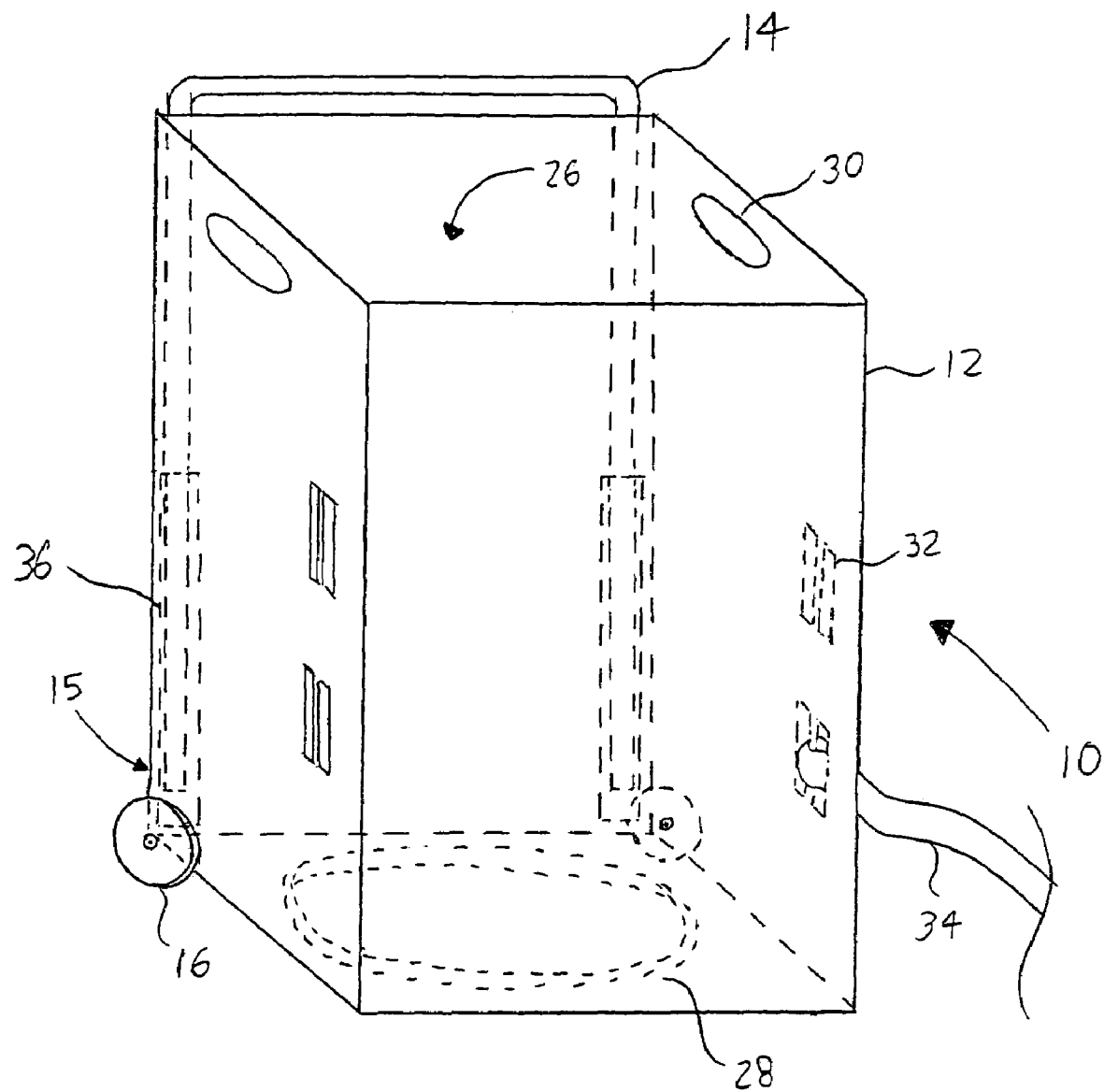
FIG. 1 is a front perspective view of a first embodiment carrier in accordance with the present invention.

For purposes of the description hereinafter, the spatial or directional terms, such as "top", "bottom", "back", "front", "upward", "downward", "upright", "vertical", "horizontal" and derivatives thereof, shall relate to the invention as it is oriented in the drawing figures. However, it is to be understood that the invention may assume various alternative variations, except where expressly specified to the contrary. It is also to be understood that the specific apparatus illustrated in the attached drawings, and described in the following specification, is simply an exemplary embodiment of the invention. Hence, specific dimensions and other physical characteristics related to the embodiments disclosed herein are not to be considered as limiting.

The component parts of the present invention may be constructed from materials including, but not limited to, wood, plastic, steel, and aluminum, with the components being joined by various means, including, but not limited to, threaded engagement, welding, bolting, wedging, tension engaging, and gluing.

Figure 2:
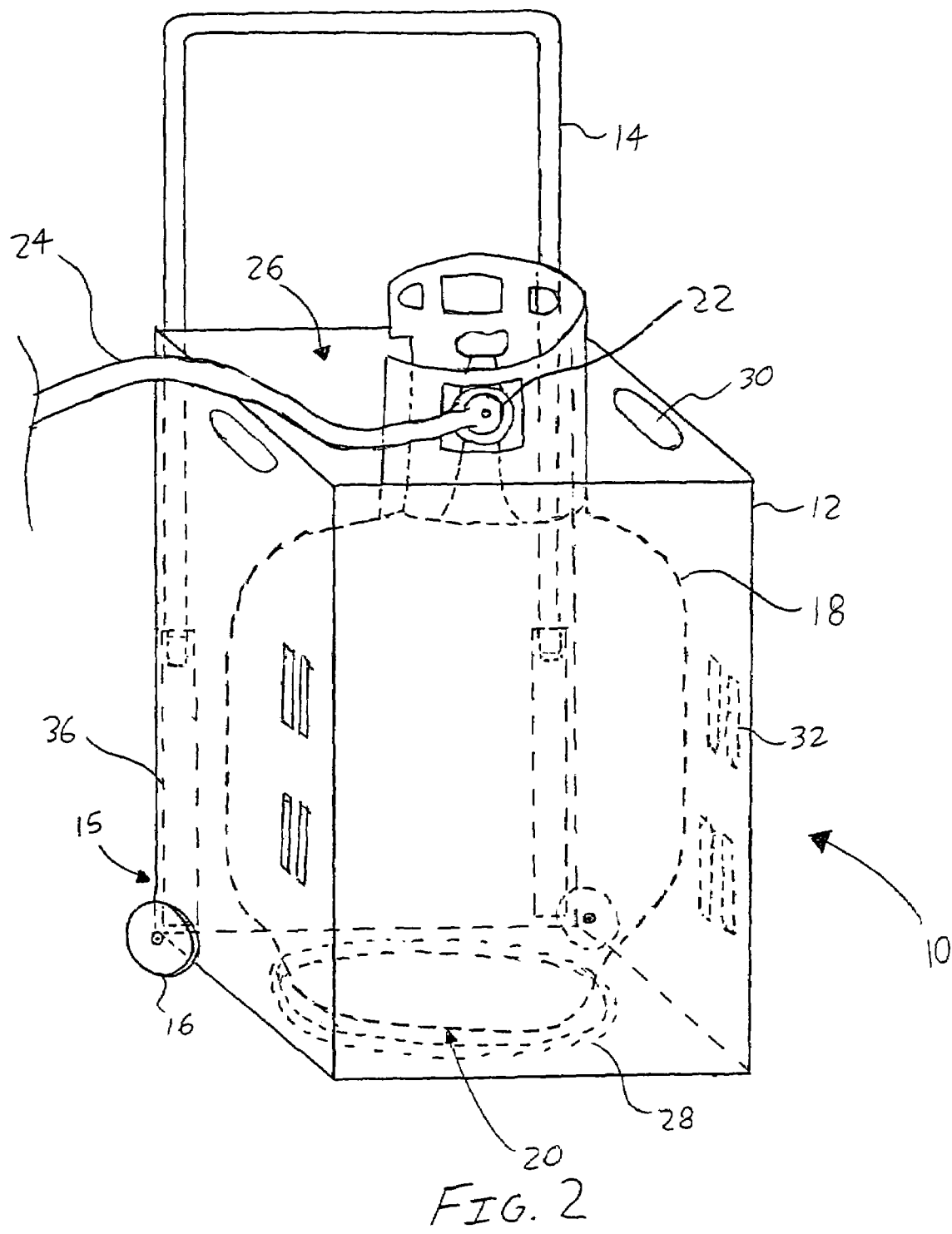
FIG. 2 is a front perspective view of the first embodiment carrier of FIG. 1, having a cylinder situated therein, in accordance with the present invention.

Referring now to the drawings in detail, FIG. 1 shows a carrier 10 according to a first embodiment of the present invention. The first embodiment gas cylinder carrier 10 includes a container 12, a telescoping handle 14, and a plurality of wheels 16. With continuing reference to FIG. 1, FIG. 2 depicts a gas cylinder 18 situated within the container 12. The gas cylinder 18 may be a standard propane tank having a base 20 and a valve connection 22. The valve connection 22 may optionally have a hose 24 attached thereto. Although reference is made to the gas cylinder 18, it is to be understood that the present invention may also be used with cylinders containing other substances, such as liquid.

Figure 3:
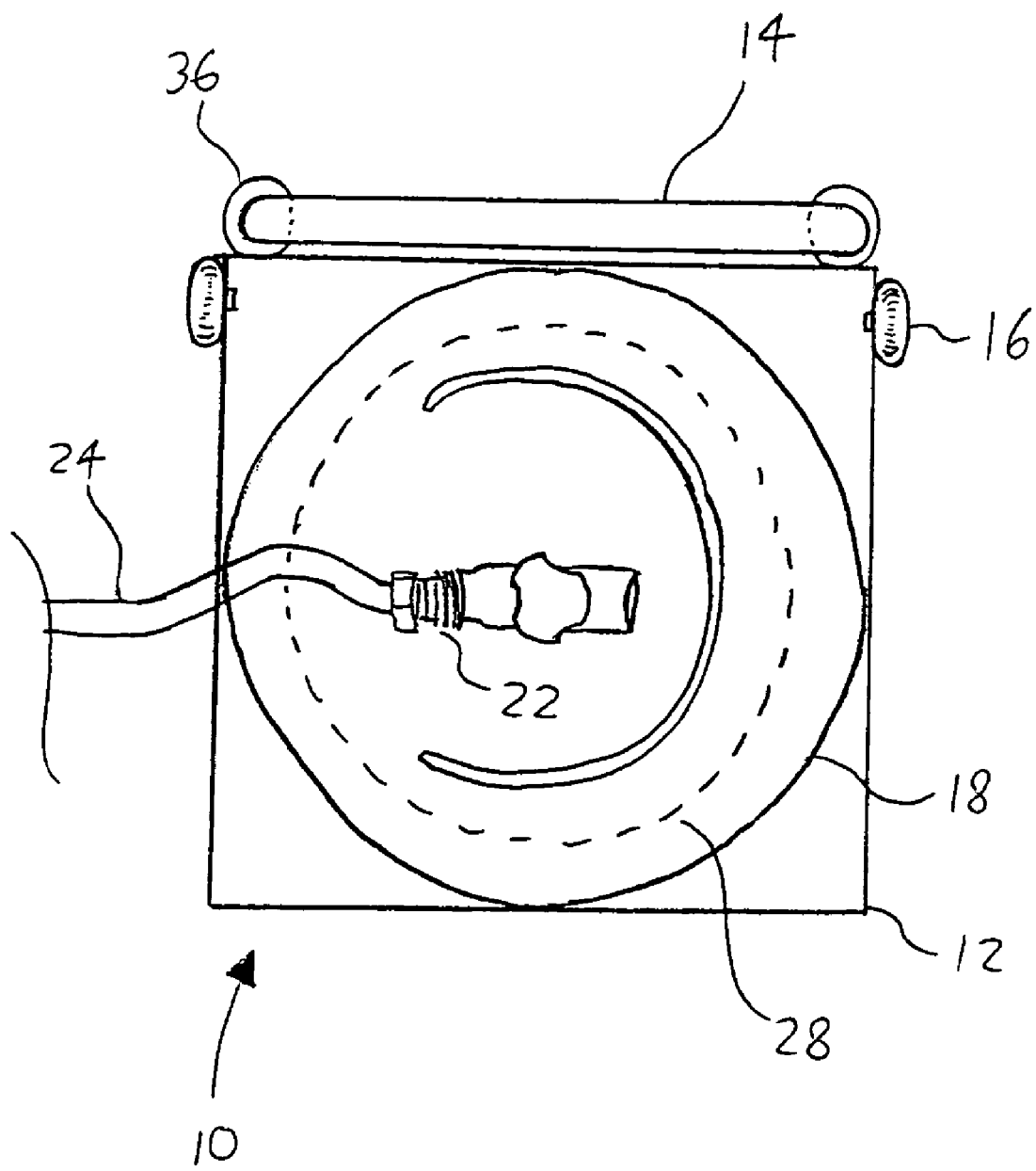
FIG. 3 is a top view of the first embodiment carrier, having the cylinder situated therein, as shown in FIG. 2.

The container 12 is of box-like or rectangular proportions having a plurality of side portions, i.e., left side portion, right side portion, front portion, and rear portion, and a top portion, and a bottom portion. The top portion has an opening 26 therein. The container 12 may be made of any suitable material, such as metal, wood, or plastic. The container 12 may also be made from a modified milk crate. The inside bottom of the container 12 may include an indented bottom 28 to act as a stabilizer. The indented bottom 28 is slightly larger in diameter than the base 20 of the gas cylinder 18. After insertion of the gas cylinder 18 through the open end 26 of the container 12, the indented bottom 28 snugly receives the base 20 of the gas cylinder 18. It is to be understood that other stabilizer means may be utilized to stabilize the base 20 of the gas cylinder 18 including, but not limited to, a partially or fully raised ring, tabs (not shown) that may engage slots in the base 20, or a clamping mechanism (not shown) that tightens around the base 20 of the gas cylinder 18. Additionally, as shown in FIG. 3, the sides of the container 12 are preferably sized to frictionally engage the gas cylinder 18. Therefore, once the gas cylinder 18 is situated within the container 12, the gas cylinder 18 is prevented from both horizontal and vertical movement due to the indented bottom 28 and frictional support provided by the sides, respectively. Returning to FIG. 2, when the gas cylinder 18 is properly situated within the container 12, the valve connection 22 extends above the top of the container 12 and is exposed so as to allow a person to easily connect the hose 24 to the valve connection 22. This allows the person to use the gas cylinder 18 even when it remains situated within the first embodiment gas cylinder carrier 10. There is no bulky lid in the way in this embodiment.

Additionally, the container 12 may include a means for holding and carrying the first embodiment gas cylinder carrier 10, including, but not limited to, hand holes 30 or handles (not shown). Preferably, the hand holes 30 are located on opposite sides of the container 12 to provide for even weight distribution when using the carrier 10.

It may be necessary to transport the first embodiment gas cylinder carrier 10 in a vehicle. Due to the safety concerns involved in transporting gas cylinders 18, the container 12 includes one or more securing holes 32 or receiving openings for accommodating a strap 34 therein. The strap 34 may then be secured to a portion of the vehicle (such as a truck bed tie-down or a seatbelt) to prevent the container 12 from shifting during transit.

Figure 4:
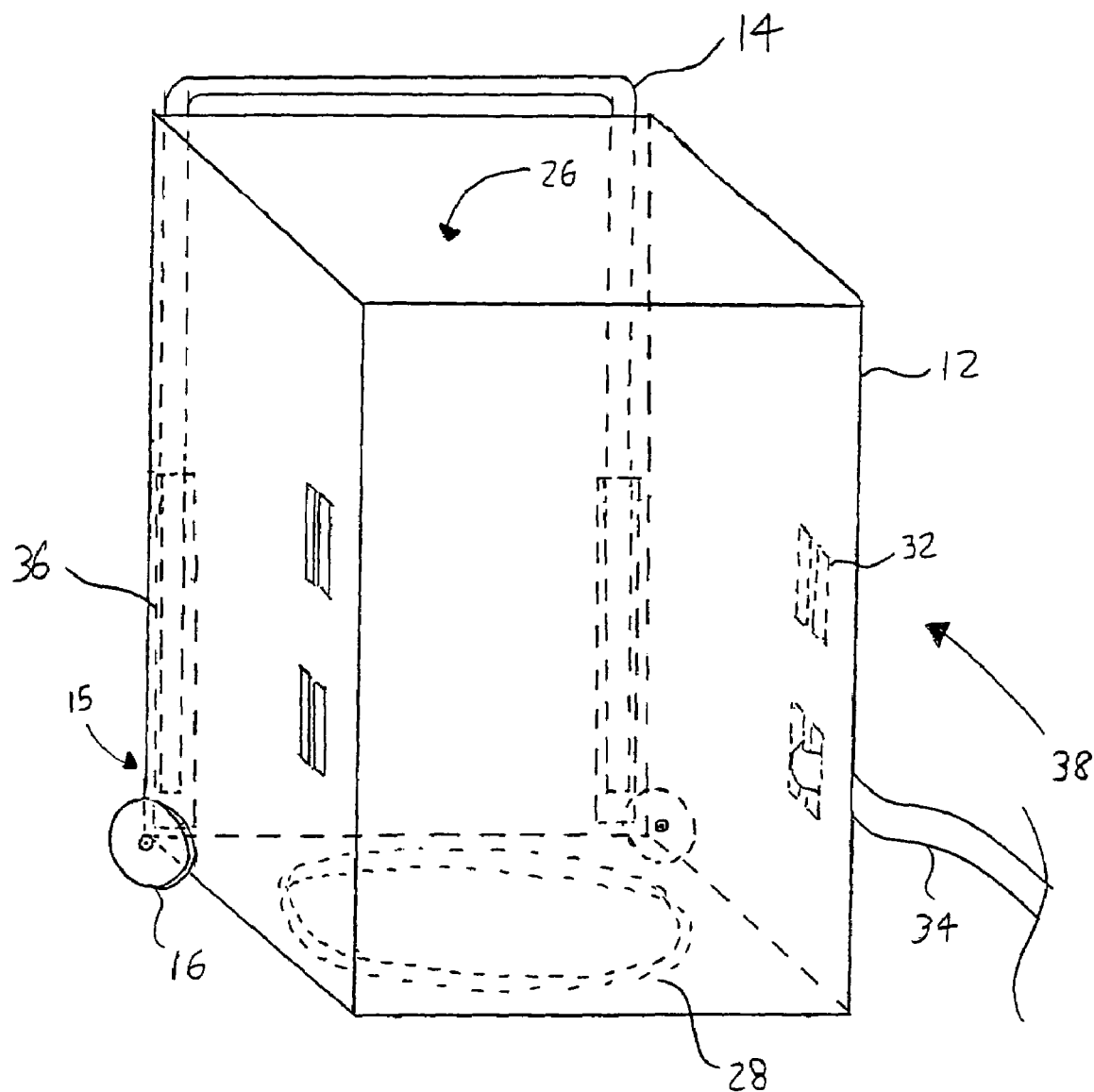
FIG. 4 is a front perspective view of a second embodiment of the carrier in accordance with the present invention.

The telescoping handle 14 and the plurality of wheels 16 of the first embodiment gas cylinder carrier 10 allow the person to wheel the gas cylinder 18 from one location to another without incurring any strain or difficulty. To this end, the telescoping handle 14 may be part of a frame 15, wherein the handle 14 is adjustable in that it can slide in and out of one or more shafts 36 located on the back side or side portion of the container 12. Preferably, the container 12 includes two wheels 16, at the bottom, on opposite sides of, and toward the back of the container 12. The wheels 16 may be attached to the frame 16 and thus be integrated into a portion of the telescoping handle 14 or may be attached directly to the container 12. With reference to FIG. 1, when the first embodiment gas cylinder carrier 10 is neither in use nor is being transported, the telescoping handle 14 is in a down position. With reference to FIG. 2, when the first embodiment gas cylinder carrier 10 is about to be transported via the plurality of wheels 16, preferably, the person pulls the telescoping handle 14 into an upward position. The person then pulls back on the telescoping handle 14, thereby tilting and pivoting the first embodiment gas cylinder carrier 10 on the plurality of wheels 16, and then pushes or pulls the telescoping handle 14 to move the first embodiment gas cylinder carrier 10. It is to be understood that other means may also be employed to provide up and down adjustability to the telescoping handle 14, including, but not limited to, a collapsible handle and a foldable handle. FIG. 4 depicts a second embodiment gas cylinder carrier 38 without the hand-holes 30.

Figure 5:
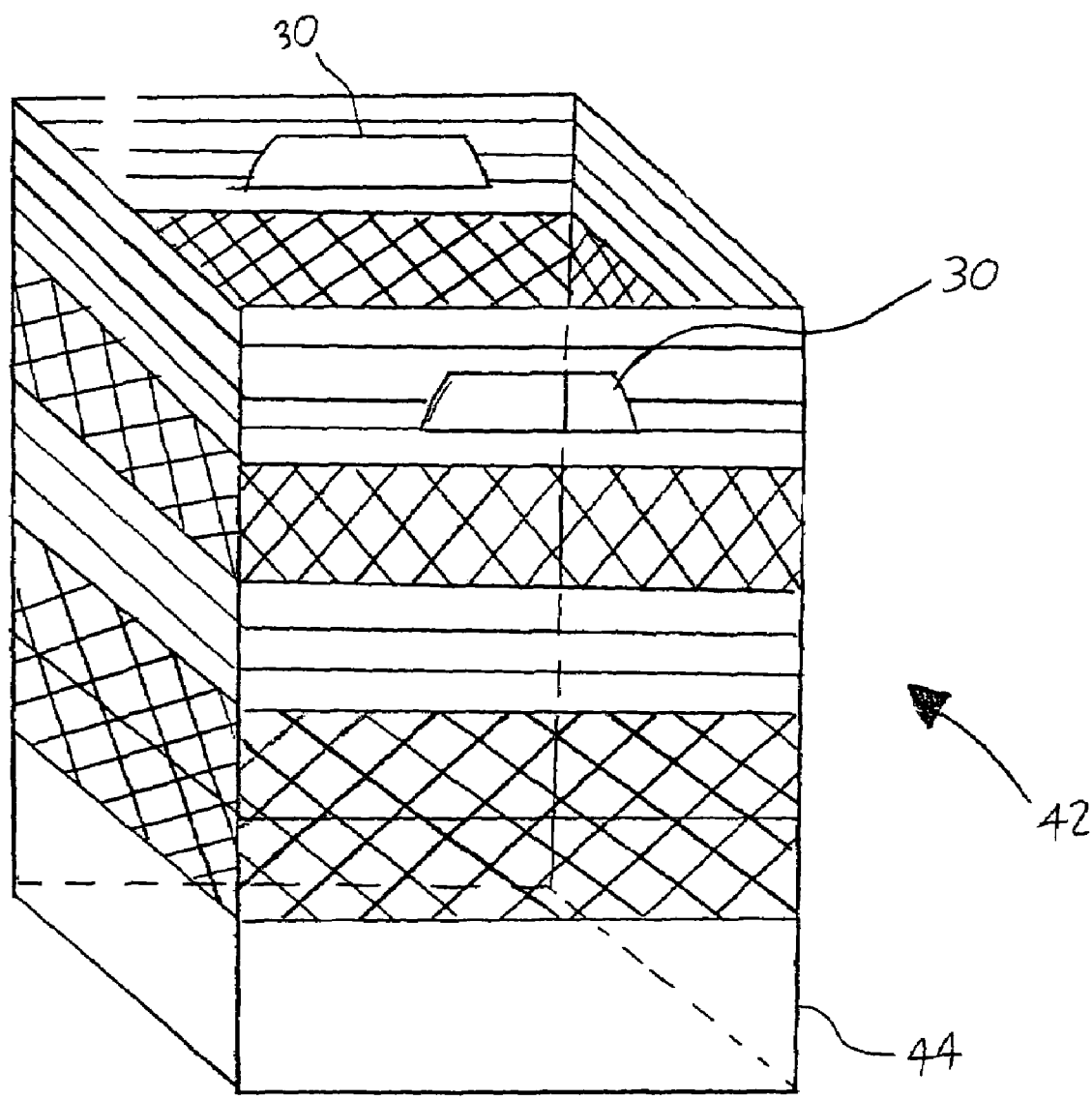
FIG. 5 is a front perspective view of a third embodiment of the carrier in accordance with the present invention.

FIG. 5 depicts a third embodiment gas cylinder carrier 42, wherein the container is a modified milk crate 44. The modified milk crate 44 is preferably made of molded plastic or some other lightweight, yet sturdy, material. The side portions of the modified milk crate 44 may be of a latticed design. The modified milk crate 44 is dimensioned to receive a standard propane tank, or gas cylinder 18, with a friction fit. It may include some of the elements of the previous embodiments, although including, but not limited to, the hand holes 30.

Figure 6:
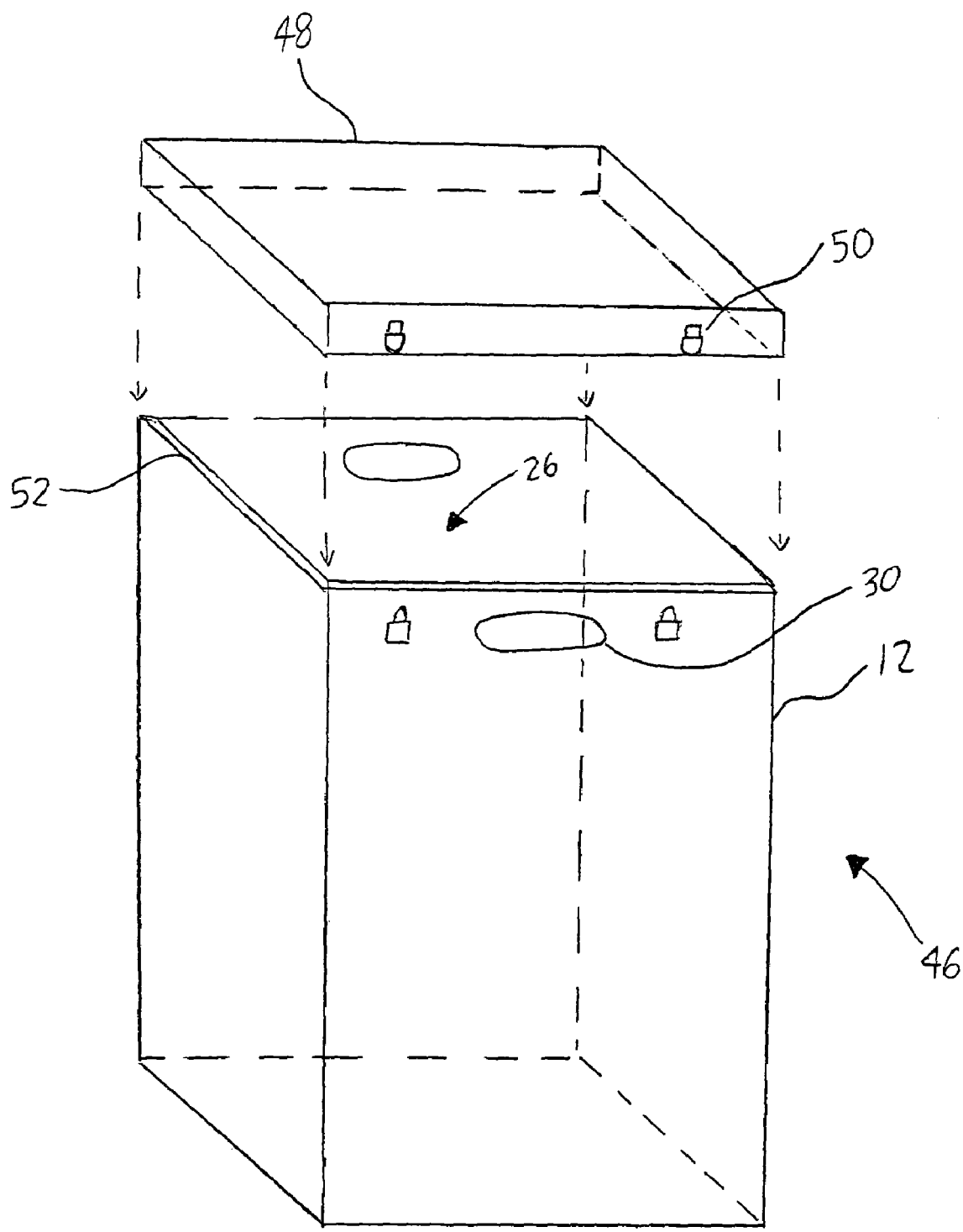
FIG. 6 is a front perspective view of a fourth embodiment of the carrier in accordance with the present invention.

FIG. 6 depicts a fourth embodiment gas cylinder carrier 46, including the container 12 having a lid 48 covering the opening 26 of the container 12. The lid 48 may be pivotally or removably attached to the container 12 by one or more hinges (not shown) or closures 50, respectively. The lid 48 is sized to enclose the opening 26 when the gas cylinder 18 is inserted therein. Additionally, the top of the container 12 may have a lip 52, so that the lid 48 can be snugly secured onto the top of the container 12. The container 12 of the fourth embodiment gas cylinder carrier 46 may include some of the elements of the previous embodiments, including, but not limited to, the hand holes 30.

Figure 7:
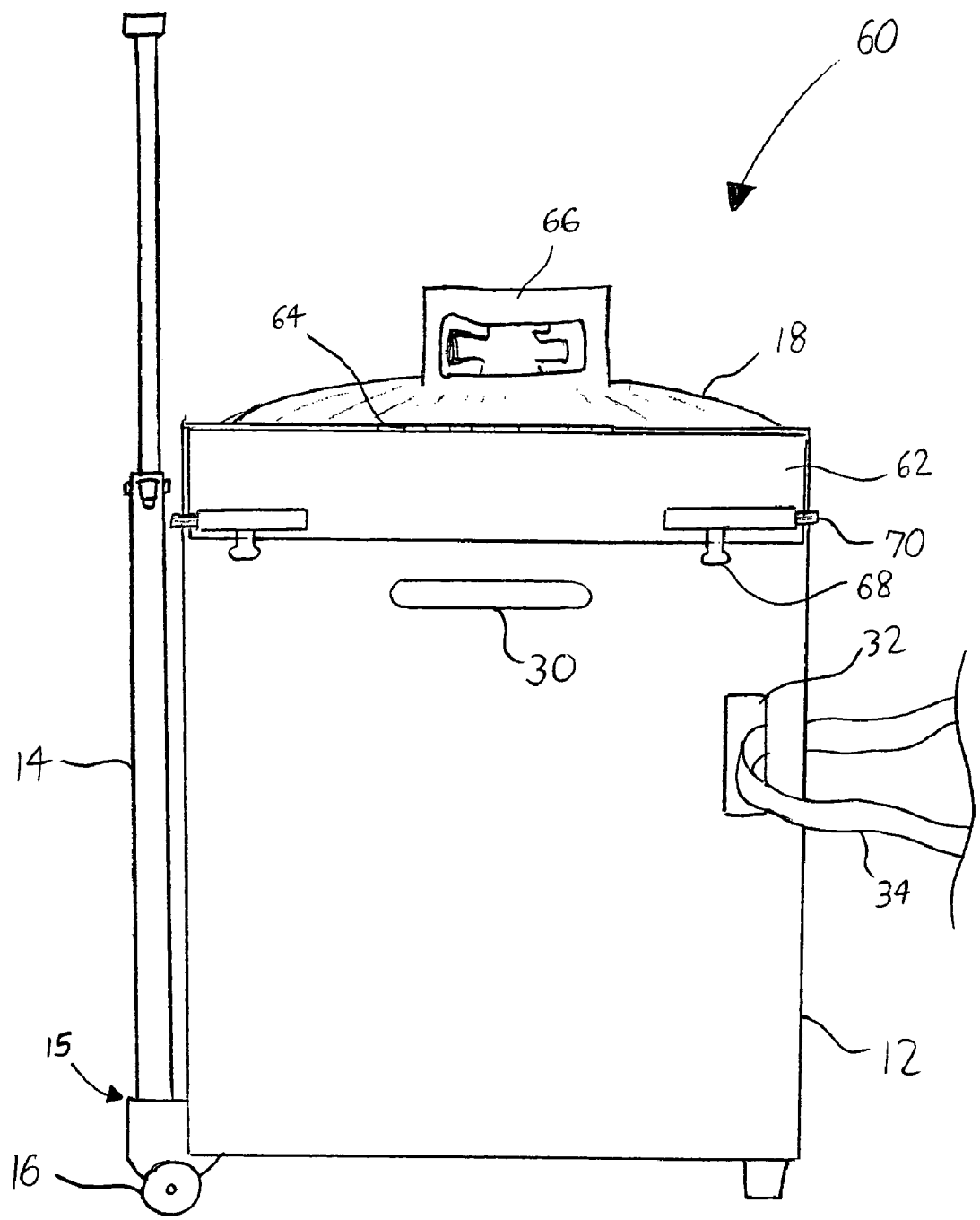
FIG. 7 is a side view of a fifth embodiment of the carrier in accordance with the present invention.
Figure 8:
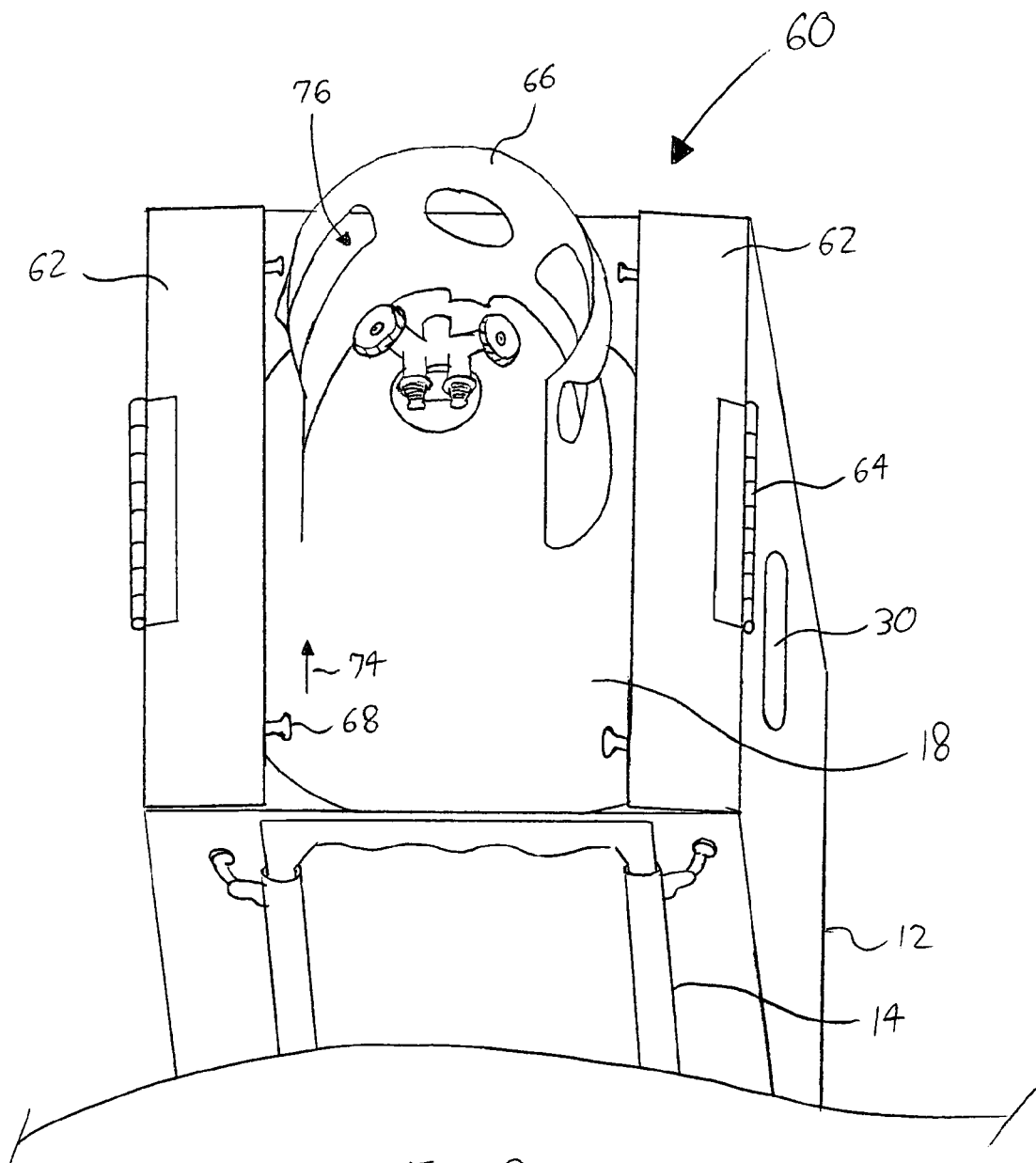
FIG. 8 is a top perspective view of the fifth embodiment of the carrier with the side flaps in a closed position, having the cylinder situated therein.
Figure 9:
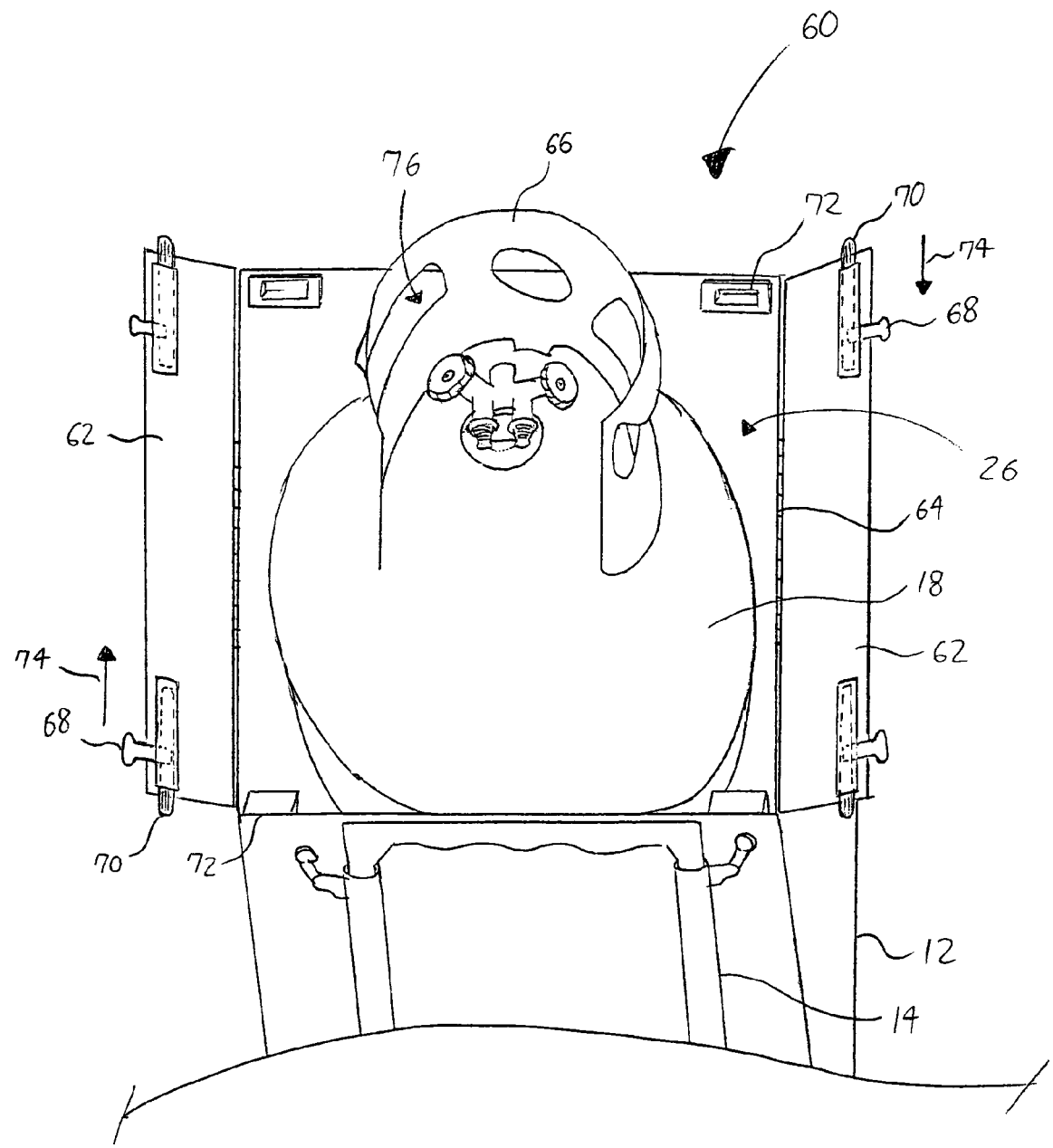
FIG. 9 is a top perspective view of the fifth embodiment of the carrier with side flaps in a partially open position, having the cylinder situated therein.
Figure 10:
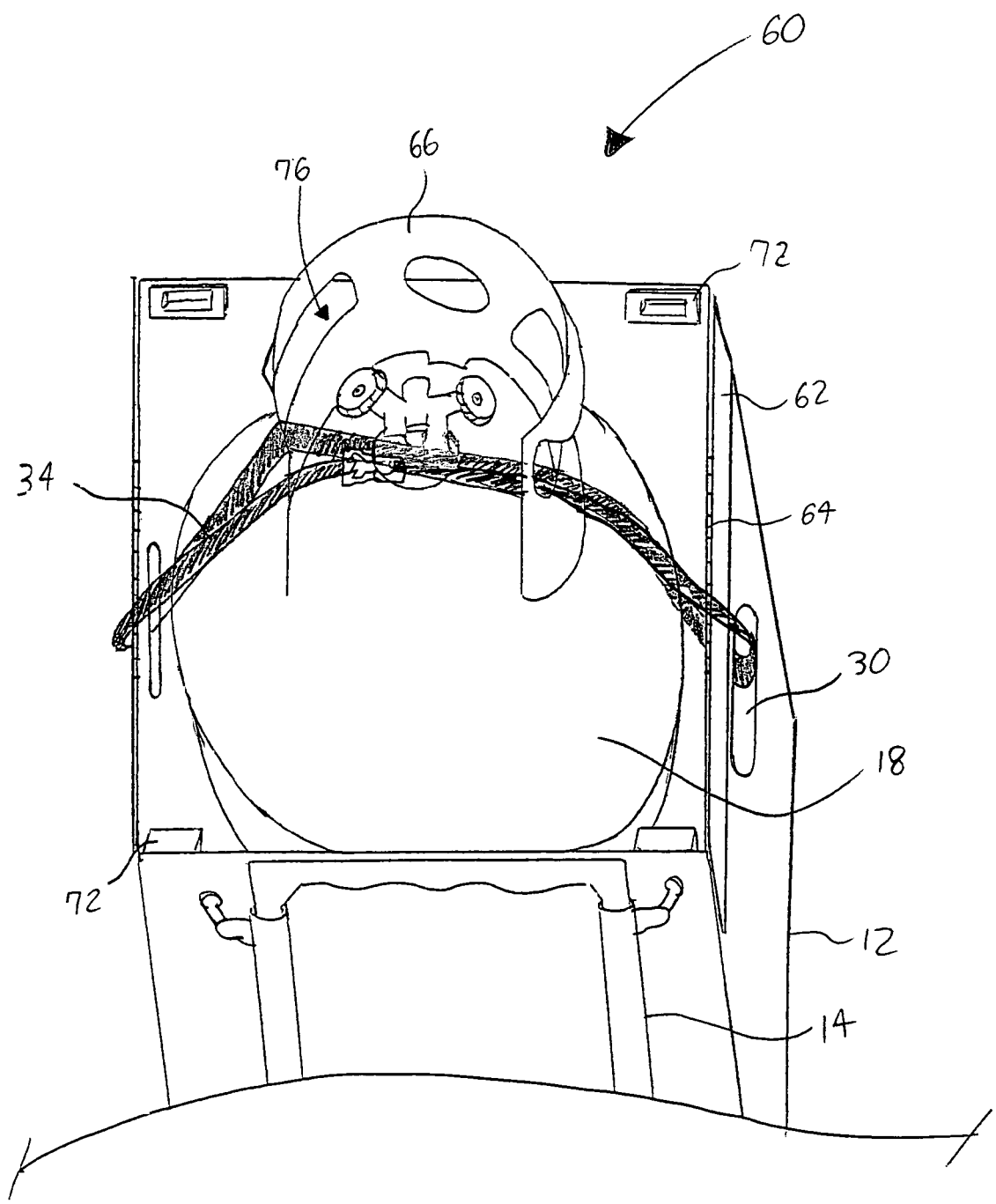
FIG. 10 is a top perspective view of the fifth embodiment of the carrier having the cylinder situated therein and secured by a strap.

FIGS. 7–11 depict a fifth embodiment gas cylinder carrier 60, including the container 12 having side flaps 62. The side flaps 62 are pivotally connected to opposing sides near the top of the container 12 via hinges 64. When the side flaps 62 are in an open position, as shown in FIG. 7, the gas cylinder 18 may be inserted into the container 12. The side flaps 62 may then be moved into a closed position, as shown in FIG. 8, so that the side flaps cover only a portion of the gas cylinder 18. A valve guard 66 of the gas cylinder 18 thus remains exposed and protrudes out of the opening 26 of the container 12. Thus, the gas cylinder 18 may be used with a device utilizing the gas therein, while the gas cylinder is still within the container 12. In the preferred embodiment, each side flap 62 includes releasable engagement means, such as one or more tension engaging levers 68 situated along an outside edge of the side flap 62. Each lever 68 is connected to a catch, such as a dowel 70 or other suitable part that is able to extend beyond an edge of the side flap 62. Each dowel 70 is configured to be received into a respective receiving portion 72 situated on an upper, internal surface of the container 12, thereby, securing the side flaps 62 in the closed position. For example, moving the lever 68 in a direction designated by an arrow 74 causes a spring (not shown) to compress, thereby allowing the dowel 70 to be held in a retracted position. Once side flap 62 is in the closed position, the lever 68 may be released, which causes the dowel 70 to extend into the receiving portion 72 and be engaged therein. It will be apparent that other equivalent suitable means of securing the side flaps 62 in a closed position may be utilized, such as Velcro®, hook and eye arrangements, etc.

When the side flaps 62 are secured in a closed position, the gas cylinder 18 is prevented from being removed from the container 12, as the opening 26 is reduced in size and is smaller in width than the diameter of the gas cylinder 18. Thus, by grasping onto a valve guard opening 76 of gas cylinder 18, the person may carry the gas cylinder 18 while it is protectively encased by the fifth embodiment gas cylinder carrier 60.

The fifth embodiment gas cylinder carrier 60 may also include the telescoping handle 14 and the plurality of wheels 16, discussed above, to allow a user to wheel the gas cylinder 18 from one location to another without incurring any strain or difficulty. Additionally, the fifth embodiment gas cylinder carrier 60 may include hand holes 30 located on opposite sides of the container 12.

The fifth embodiment gas cylinder carrier 60 is able to accommodate gas cylinders of various proportions including, but not limited to, 4.25 lb., 11 lb., 11.5 lb., 20 lb., 30 lb., 40 lb, 43.5 lb. and 60 lb. liquid propane gas cylinder sizes. Additionally, various-sized refrigerant recovery tanks may also be accommodated. These include, but are not limited to, freon recovery tanks having 26.2 lb. and 47.7 lb. capacities. If a gas cylinder is too large for the side flaps 62 to be secured in the closed position, the side flaps 62 may be kept in the open position. In this case, the strap 34 shown in FIG. 1 may be inserted through and around hand holes 30 and any of the valve guard openings 76 to secure the gas cylinder 18 within the fifth embodiment gas cylinder carrier 60. As with the use of the side flaps 62 described above, use of only the strap 34, allows the person to carry the gas cylinder 18 while it is protectively encased by the fifth embodiment gas cylinder carrier 60. It is to be understood that the strap 34 may also be used in conjunction with the side flaps 62 in a closed position.

Figure 11:
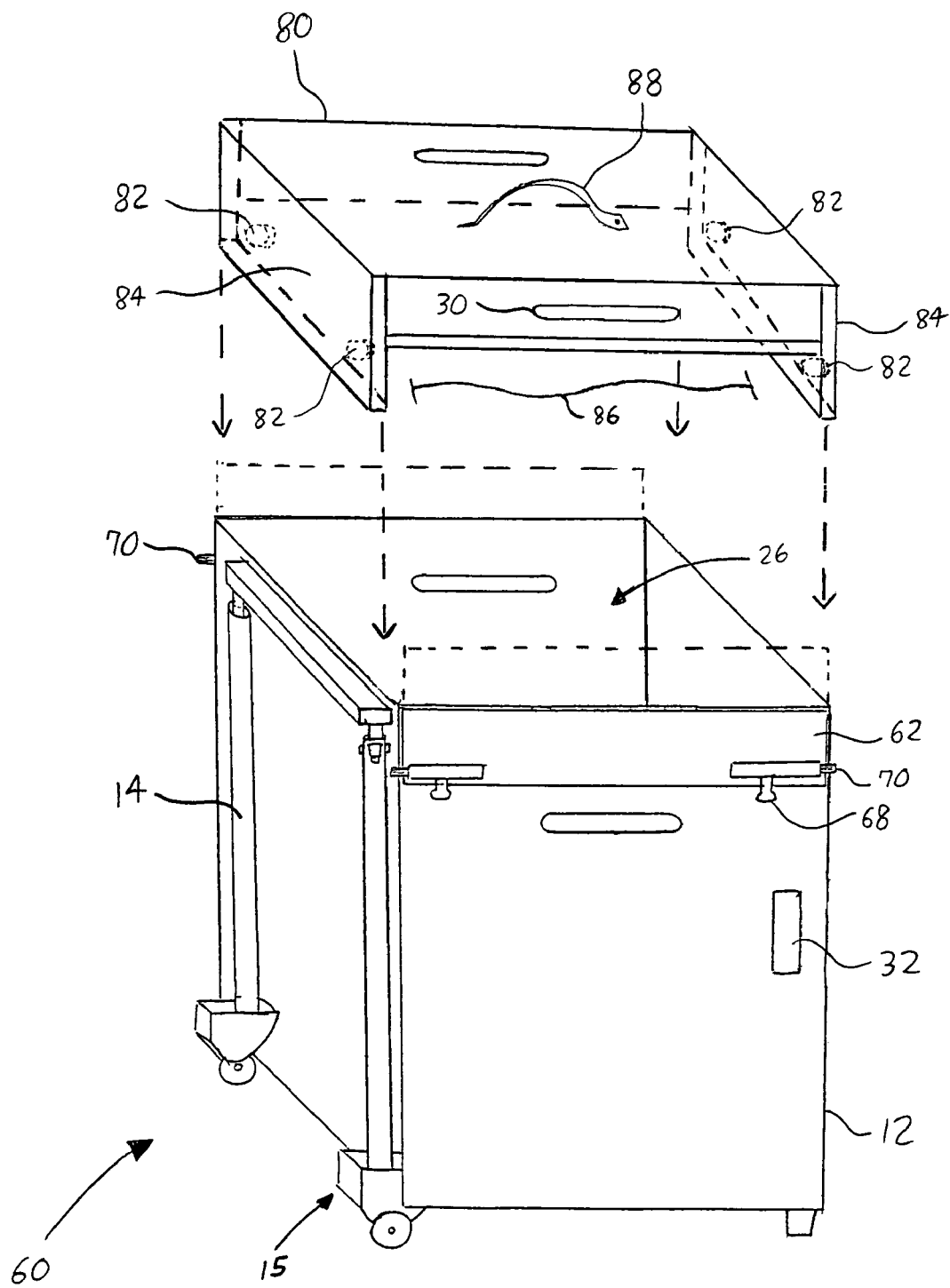
FIG. 11 is a front perspective view of the fifth embodiment of the carrier having a removable lid.

With reference to FIG. 11, the fifth embodiment gas cylinder carrier 60 may accommodate a lid 80. The lid 80 is adapted to cover the opening 26 of the container 12 and be removably attached thereon. Specifically, the lid 80 includes a plurality of notches 82 integrated within the side panels 84 of the lid 80, although it is to be understood that any suitable receiving opening may be utilized. The depth of each notch 82 is sufficient to accommodate a portion of a corresponding dowel 70 of the side flaps 62. Additionally, the lid 80 includes cutaway portions 86 that correspond in length and height to the length and height of the corresponding side flaps 62. In operation, to secure the lid 80 to the fifth embodiment gas cylinder carrier 60, the side flaps 62 are raised to a vertical position as drawn in phantom in FIG. 11. As the lid 80 is lowered, the levers 68 are moved to cause the corresponding dowels 70 to retract. Once the notches 82 are aligned with the corresponding dowels 70, the levers 68 may be released to cause the dowels 70 to extend into the corresponding notches 82 and to be engaged therein. Thus, the lid 80 is secured to the fifth embodiment gas cylinder carrier 60. It is to be understood that the dimensions of the lid 60 are such that the lid may be utilized in the presence of the gas cylinder 18 inserted within the container 12. By utilizing the lid 80, various other carrying means for the fifth embodiment gas cylinder carrier 60 may be incorporated into the lid 80, including, but not limited to hand holes 30 and a handle 88 secured to the top of the lid 80.

As is the case with the previously discussed embodiments, it may be necessary to transport the fifth embodiment gas cylinder carrier 60 in a vehicle. To this end, the fifth embodiment gas cylinder carrier 60 may include the securing holes 32 or receiving openings for accommodating another strap 34 therein. The strap 34 may include a seatbelt, thus allowing the fifth embodiment gas cylinder to also be transported inside a vehicle, as opposed to outside of a passenger compartment of the vehicle.

It is to be understood that elements of the various embodiments described above may be combined to form other embodiments of the present invention. The invention is not limited to accommodating liquid propane gas cylinders and refrigerant recovery tanks, as it is envisioned that the present invention may also accommodate cylinders containing other substances.

The above invention has been described with reference to the preferred and alternative embodiments. Obvious modifications, combinations, and alterations will occur to others upon reading the preceding detailed description. It is intended that the invention be construed as including all such modifications, combinations, and alterations insofar as they come within the scope of the appended claims or the equivalents thereof. For example, wheels and a handle may be added to the friction fit embodiment shown in FIG. 5.

The invention claimed is:

1. A carrier for transporting a portable propane tank having a top portion including a valve connection, the carrier comprising:
    a container of box-shaped proportions for accommodating the portable propane tank therein, the container including a top portion having an opening therein, a bottom portion, and a plurality of side portions;
    at least one wheel attached to the bottom portion of the container;
    one or more handles for gripping the carrier; and
    a plurality of side flaps pivotally connected to the container, wherein when the side flaps are in an open position the side flaps are substantially parallel to the respective side portions, wherein when the side flaps are moved to a closed position, the opening of the container is only partially covered, wherein the container is dimensioned such that when the portable propane tank is positioned within the container on the bottom portion thereof, the top portion of the portable propane tank extends through the partially covered opening and the valve connection is external of the container to allow access to the valve connection.

2. The carrier of claim 1, wherein the handle comprises a telescoping handle attached to one of the plurality of side portions.

3. The carrier of claim 1, further comprising a plurality of levers affixed to at least one of the side flaps, wherein each of the levers is tension engaged, the levers configured to move from a first position to a second position, wherein movement from the first position to the second position secures the at least one of side flaps in a closed position, thereby securing the portable propane tank within the container.

4. The carrier of claim 3, further comprising:
    a plurality of dowels, wherein each dowel corresponds to one of the levers; and a plurality of receiving portions in the side portions, wherein each of the receiving portions is adapted to receive a corresponding dowel therein, thereby securing the associated side flap to the container.

5. The carrier of claim 1, wherein the handle comprises at least one hand hole in one of the side portions of the container.

6. The carrier of claim 1, further comprising one or more strap receiving openings in one of the side portions of the container.

7. The carrier of claim 6, further comprising a strap, wherein the strap is received by one or more of the strap receiving openings.

8. The carrier of claim 1, including two wheels mounted on a frame and positioned adjacent the bottom portion of the container.

9. A carrier for transporting a portable propane tank having a top portion including a valve connection, the carrier comprising:
- a container of box-shaped proportions for accommodating the portable propane tank therein, the container including a top portion having an opening therein, a bottom portion, and a plurality of side portions;
- two side flaps pivotally connected to the container, wherein the two side flaps are movable from an open to a closed position and are sized to only partially cover the opening of the container, wherein when the two side flaps are in the open position the two side flaps are substantially parallel to two of the plurality of side portions that are opposite each other;
- releasable engagement means on each of the two side flaps;
- a plurality of receiving portions in the side portions, wherein each of the plurality of receiving portions cooperates with the releasable engagement means when each of the side flaps is moved from the open to the closed position, thereby securing each of the side flaps to the container, wherein the container is dimensioned such that when the portable propane tank is positioned within the container on the bottom portion thereof, the top portion of the portable propane tank extends through the partially covered opening when the two side flaps are in the closed position, whereby the valve connection of the portable propane tank is external of the container to allow access to the valve connection;
- at least one wheel attached to the bottom portion of the container; and
- a telescoping handle attached to one of the plurality of side portions.

* * * * *